(12) United States Patent
Larsen et al.

(10) Patent No.: US 6,691,980 B2
(45) Date of Patent: Feb. 17, 2004

(54) BALANCED VALVE WITH ACTUATOR

(75) Inventors: Todd W. Larsen, Milaca, MN (US); Thomas M. Bydalek, Blaine, MN (US)

(73) Assignee: Tescom Corporation, Elk River, MN (US)

(*) Notice: Subject to any disclaimer, the term of this patent is extended or adjusted under 35 U.S.C. 154(b) by 0 days.

(21) Appl. No.: 10/190,207

(22) Filed: Jul. 5, 2002

(65) Prior Publication Data

US 2004/0004201 A1 Jan. 8, 2004

(51) Int. Cl.[7] .................................................. F16K 31/02
(52) U.S. Cl. .............................. 251/129.04; 251/129.11; 251/129.15; 251/129.07
(58) Field of Search ........................ 251/129.07, 129.11, 251/129.15, 129.04, 282

(56) References Cited

U.S. PATENT DOCUMENTS

| | | |
|---|---|---|
| 3,985,333 A | 10/1976 | Paulson |
| 5,351,935 A | 10/1994 | Miyoshi |
| 6,116,276 A * | 9/2000 | Grill ...................... 251/129.07 |
| 6,224,034 B1 * | 5/2001 | Kato et al. ............. 251/129.11 |

* cited by examiner

Primary Examiner—John Bastianelli
(74) Attorney, Agent, or Firm—Clayton R. Johnson

(57) ABSTRACT

The valve device includes a valve body and a bonnet with a fitting clamped therebetween and extending within body and bonnet bores. The fitting and valve body have bore portions with a valve stem extended therein and through a valve seat and having opposite end portions of the same diameters and in fluid sealing relationship with the above bore portions axially opposite the valve seat. The body has inlet and outlet passages opening to the fitting and body bores axially opposite the valve seat and axially intermediate the stem end portions. A sensor is connected to the valve stem and is movable against spring action to move the valve stem to its open position. An actuator, for example an electric motor, is mounted to the bonnet and operable for forcing the sensor to move the valve stem to its valve open position.

20 Claims, 5 Drawing Sheets

BALANCED VALVE WITH ACTUATOR

BACKGROUND OF THE INVENTION

This invention is for a balanced valve with a sensor for moving the valve stem from one its valve open and closed positions to the other and powered actuator apparatus for moving the sensor in at least one axial direction.

U.S. Pat. No. 5,351,935 to Miyoshi discloses a control valve having a valve member resiliently urged to a closed position while a stepping motor has a threaded shaft that is axially movable by the rotation of a motor rotor. The downward movement of the shaft acting through a joint and a spring holder moves the valve member to a closed position.

U.S. Pat. No. 3,985,333 to Paulson discloses a balanced valve having a solenoid that, when energized, the valve stem is moved to an open position while a spring acts to close the valve.

In order to make improvements in valves with actuators for operating the valves between open and closed conditions, this invention has been made.

SUMMARY OF THE INVENTION

The embodiments of the valve device each include a valve body having an inlet and an outlet opening to an elongated bore extending axially through the body. A fitting has an axial bore opening to the body bore, extends within the body bore and is clamped between a bonnet and the valve body. Further, a valve seat is clamped between the fitting and the valve body axially intermediate the openings of the inlet and outlet to at least one of body bore and the fitting bore to have fluid in the body bore flow therethrough. A valve stem has opposite end portions axially slidable in the fitting and valve body bores respectively in close fit therewith with the opposite end portions being of the same diameters and a reduced diameter portion extending within the valve seat and between and joined to the opposite end portions. The actuator may be one of a motor driven device, a solenoid and pneumatic mechanism for applying pressurized fluid to the sensor.

One of the objects of this invention is to provide new and novel means for a valve to control fluid flow between the valve inlet and outlet. Another object of this invention is to provide a new and novel balanced valve that allows a low pressure force to open or close the valve and to reduce the load on the valve seat. A still further object of this invention is to provide a new and novel valve cartridge that may be operated by different types of actuation. A different object of this invention is to provide a new and novel balance valve wherein the inlet and outlet passages are reversible to permit bi-directional flow.

DESCRIPTION OF THE PREFEERRED EMBODIMENT

Figure 1:
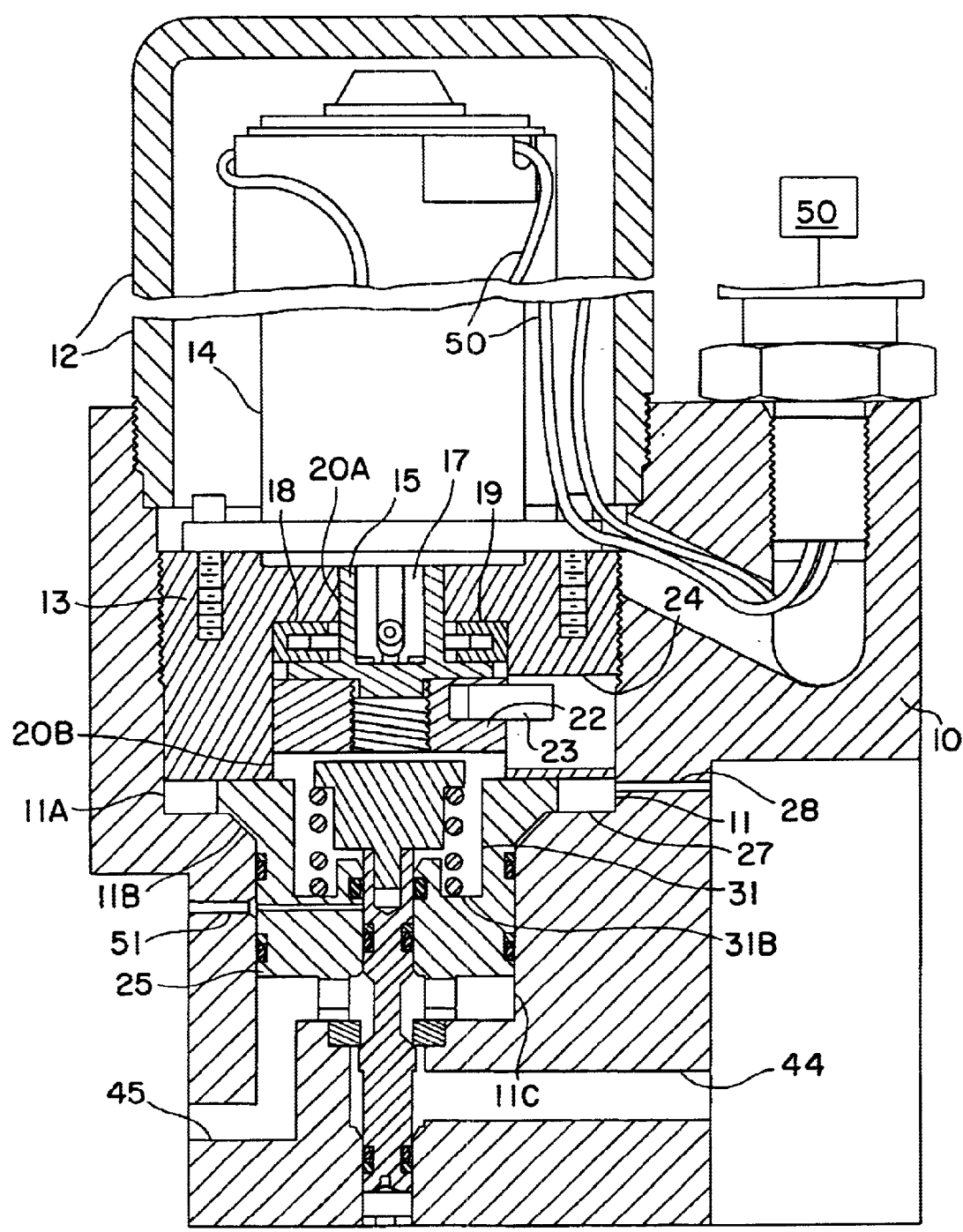
FIG. 1 is a cross sectional view of the first embodiment of the valve apparatus of this invention.
Figure 2:
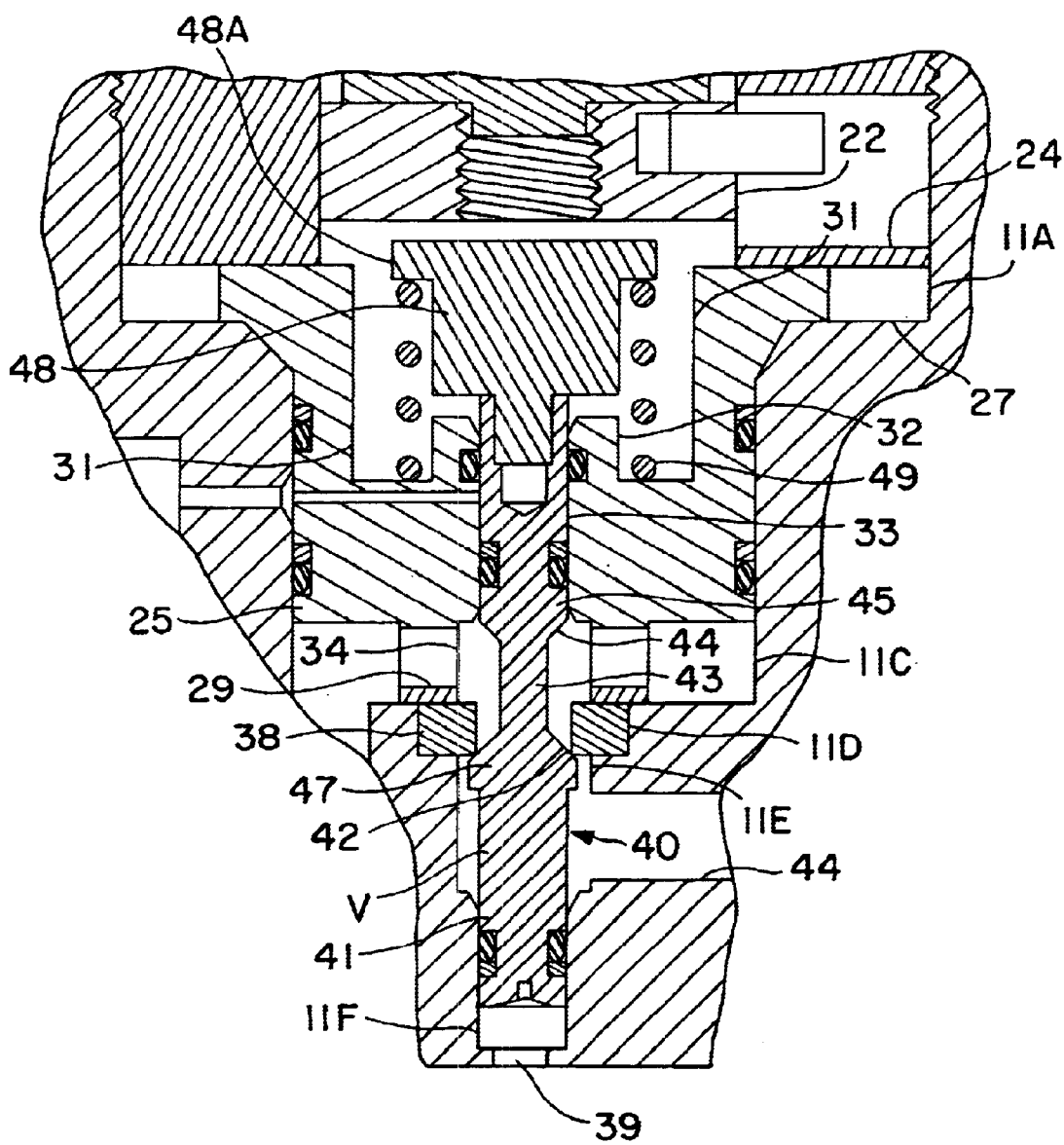
FIG. 2 is an enlarged fragmentary view of a portion of the structure of FIG. 1.

Referring to FIG. 1 of the drawings, the balance valve apparatus of the first embodiment of the invention, generally designated 16, includes a valve device having a valve body 10 with a bore 11 of varying diameters extending axially therethrough. A cap 12 is threadedly extended into the upper portion of the body bore while a bonnet (annular motor mount) 13 is threadedly mounted in the body bore below the cap. A motor 14, advantageously a D.C. motor, is bolted to the motor mount to extend into the cap.

A bearing 18 is interposed between the enlarged diametric flange of a drive shaft attachment 15 and the downwardly facing shoulder 19 formed by the opening of the upper reduced diameter bonnet bore portion 20A to the lower bonnet bore portion 20B. The attachment 15 is keyed to the shaft 17 of the motor to rotate therewith. Threadedly mounted to lower threaded end (advantageously acme threads) of the attachment and located in the bore portion 24B is a control device which includes a control element 22. A pin (key) 23 is mounted to the control element and is extended within an axially elongated slot 24 in the bonnet to prevent the control element rotating as the motor shaft is rotated but permitting limited axial movement as the motor shaft is rotated. Further, the portion of the bonnet bore axially inwardly of the control device is in fluid communication with the ambient atmosphere through a clearance between the attachment and the bonnet bore or a vent aperture 28 in the valve body that opens to the slot 24 and an exterior surface of the valve body.

The valve body bore 11 includes a cylindrical bore portion 11A into which the lower part of the bonnet (motor mount) extends, bore portion 11A opening to the major base of the frustoconical bore portion 11B to provide an upwardly facing shoulder 27. The minor base of the bore portion 11B opens to body bore portion 11C. A fitting 25 is extended within bore portions 11A, 11B and 11C and has an upper enlarged diametric flange clamped between the shoulder 27 and the bonnet.

The fitting has an enlarged diameter axial bore 31 opening through the top surface thereof while a smaller diameter boss 32 extending upwardly from the bottom annular wall 31B that in part defines bore 31. The fitting also has an axially elongated bore 33 opening through the top of the boss to bore 31 and at its opposite end to a slightly larger diameter bore 34 which opens through the bottom surface of the fitting. The lower end portion of the fitting is of a reduced outer diameter and abuts againsthe bottom wall that in part defines the lower end of bore portion 11C and/or the valve seat 38 located in the bonnet bore portion 11D that opens to bore portion 11C. Bore portion 11D is of a smaller diameter than bore portion 11C and at its lower end opens to a further reduced diameter bore portion 11E which advantageously is of the same diameter as bore 34. Bore portion 11E at its lower end opens to a further reduced diameter bore portion 11F which at its opposite end opens through a hole (bore portion) 39 that in turn opens through the bottom surface of the valve body. Bore portions 33, 34, 11D, 11E, 11F and 49 are coaxial.

The valve body has an inlet (passage) 44 that opens to bore portion 11E and an outlet (passage) 45 that opens to the bore portion 11C and through radial apertures 29 in the reduced diameter portion of the fitting to fitting bore portion 34 which is on the axially opposite side of the valve seat from bore portion 11E. Mounted to extend axially through the valve seat and axially movable within bores 33, 34 and bore portions 11E and 11F is the valve stem V of a valve member, generally designated 40. The lower end portion 41 of the valve stem forms a close sliding fit with the wall defining bore portion 11F and has a groove mounting an O-ring to form an axial sliding fluid seal with the wall of bore portion 11F. The diameter of the bore portion 11F is the same as that of bore portion 33.

The valve stem portion 41 is joined to a slightly larger diameter portion 47 which extends from stem portion 41 to the major base of the stem frustoconical portion 42. The diameter of stem portion 47 is greater than the inner diameter of the valve seat and of a slightly larger diameter than the axially opposite end portions 41 and 45 of the valve stem. The minor base of the frustoconical portion 42 is joined to the axially elongated, reduced diameter stem portion 43 which is of a diameter substantially smaller than the inner diameter of the valve seat. In both of the valve stem opened and closed positions, the bore 34 opens to the reduced diameter stem portion 43. The upper end of the stem portion 43 is joined to the minor base of the stem frustoconical portion 44 while its major base is joined to axially elongated stem upper portion 45. Portion 45 is of a diameter to form a close axial sliding fit with bore portion 33 and has a groove to mount an O-ring to form an axially slidable fluid seal with the wall defining bore portion 33. Further, stem portion 45 is of the same diameter as stem portion 41.

The valve member also includes a valve sensor 48 threadedly connected to the valve stem and having an axially intermediate portion that is abuttable against the boss 32 to limit the movement of the valve stem in an opening direction. Further, the sensor 48 has an upper enlarged diametric flange 48A with there being a spring 39 extending in abutting relationship to the flange and the bottom wall of the bore 31 to constantly resiliently urge the valve member to a closed position abutting against the valve seat.

When the motor is actuated to rotate its shaft in one angular direction, the control member is moved axially from the FIG. 1 position to abut against the valve sensor and move the valve sensor and thereby the valve stem from its closed position to an open position to permit pressurized fluid to flow from the inlet to the outlet. Upon the valve member being moved to its open position, the motor is automatically deactuated. In the valve member closed position, the valve stem frustoconical portion 42 abuts against the valve seat. Upon actuating the motor to rotate the motor shaft in the opposite angular direction, the control member is moved axially away from the valve seat and thereby allowing the sensor being spring urged to a valve closed position. Conventional control circuitry 50 is provided for actuating the motor to rotate its shaft in the desired angular direction to control the opening and closing of the valve member.

Figure 3:
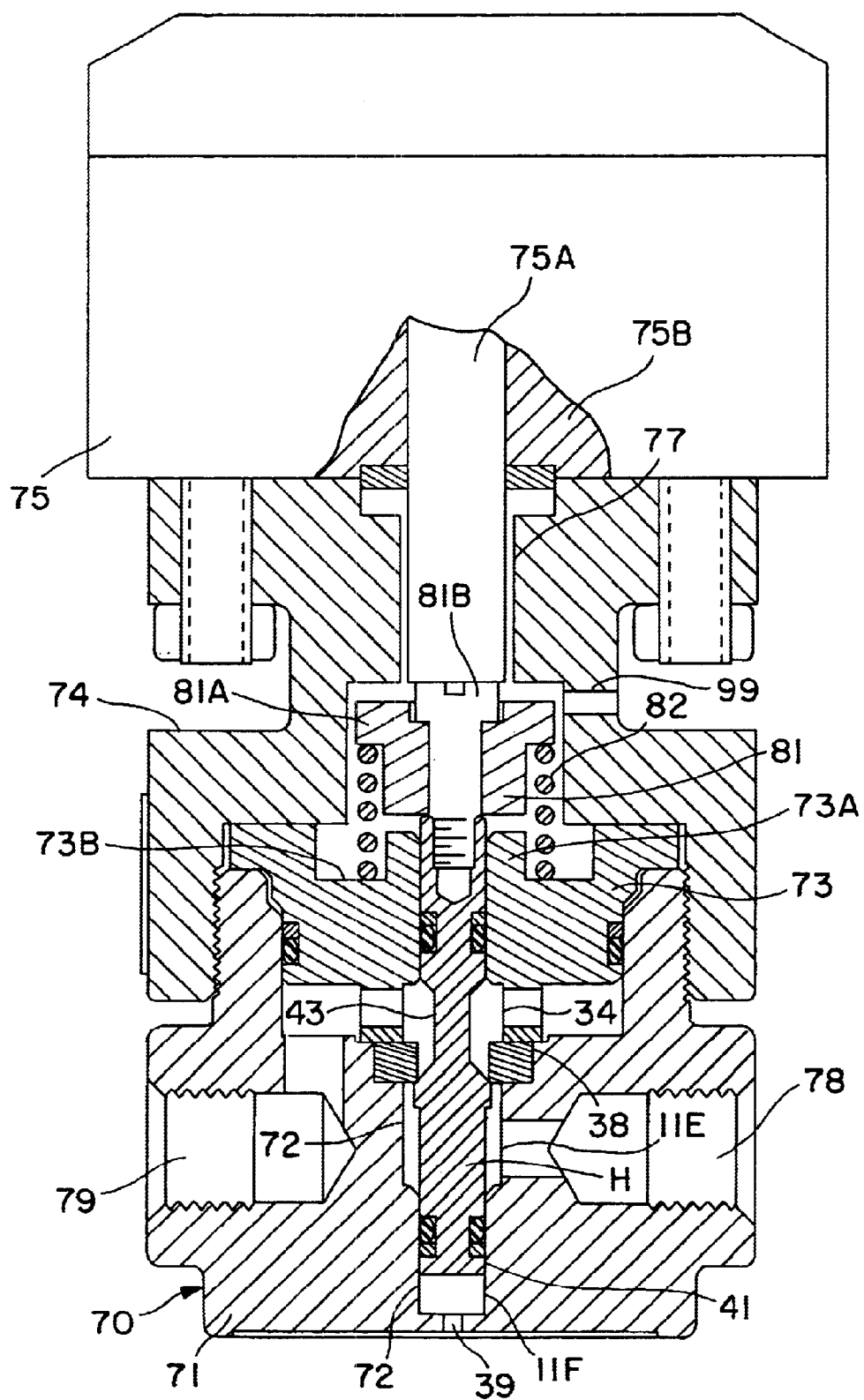
FIG. 3 is a cross sectional view of the second embodiment of the invention, with the solenoid being somewhat diagrammatically illustrated.

Referring to FIG. 3, the second embodiment of the valve device of this invention, generally designated 70, includes a valve body 71 that includes a bore 72 having bore portions 11D, 11E, 11F, 39 that are the same as that of the first embodiment and a fitting 73 having bores 33, 34 that are the same as those of the first embodiment. A bonnet (solenoid mount) 74 is threadedly mounted to the valve body and has a solenoid 75 bolted thereto. The bonnet has a bore 77 extending axially therethrough with its lower end opening to the valve body bore while a vent aperture 99 opens to the axially intermediate portion of the bore 77 and to the ambient atmosphere.

The fitting 73 is clamped between the bonnet and the valve body while a valve seat 38 is clamped between the reduced diameter portion of the fitting 73 and the valve body 71 in the same manner as that of the first embodiment. The valve body 71 has an inlet (passage) 78 opening to bore portion 11E and an outlet (passage) 79 opening through radial apertures in the fitting reduced diameter portion to bore 34 on the axially opposite side of the valve seat 38 from the opening of the inlet to bore portion 11E.

A sensor 81 is threadedly mounted to the upper end of the valve stem H, the sensor including an annular member 81A having an enlarged diametric flange with a coil spring 82 interposed between the flange and the bottom wall 73B that in part defines an annular groove surrounding the boss 73A of the fitting. The annular member 81A is axially movably extended in the intermediate diameter portion of the bonnet bore 83. The sensor also includes a screw 81B extended through the annular member and threadedly connected to the valve stem whereby the annular member is resiliently urged into abutting relationship with the head of the screw to resiliently retain the valve stem in a closed position.

The solenoid 75 includes an armature (control device) 75A abuttable against the screw and upon the solenoid coil 75B being energized, moves the sensor 81 to move the valve stem H from its closed position to its open position. The valve stem H advantageously is of the same construction and functions in the same manner as the valve stem of the first embodiment. The annular member 81A in abutting against the boss 73A limits the movement of the valve stem in a valve opening direction to a fully valve open position. Upon the coil being deenergized, the armature is retracted with the spring moving the valve member to its valve closed position. Control circuitry (not shown) is provided for controlling the energization and deenergization of the solenoid coil.

Figure 4:
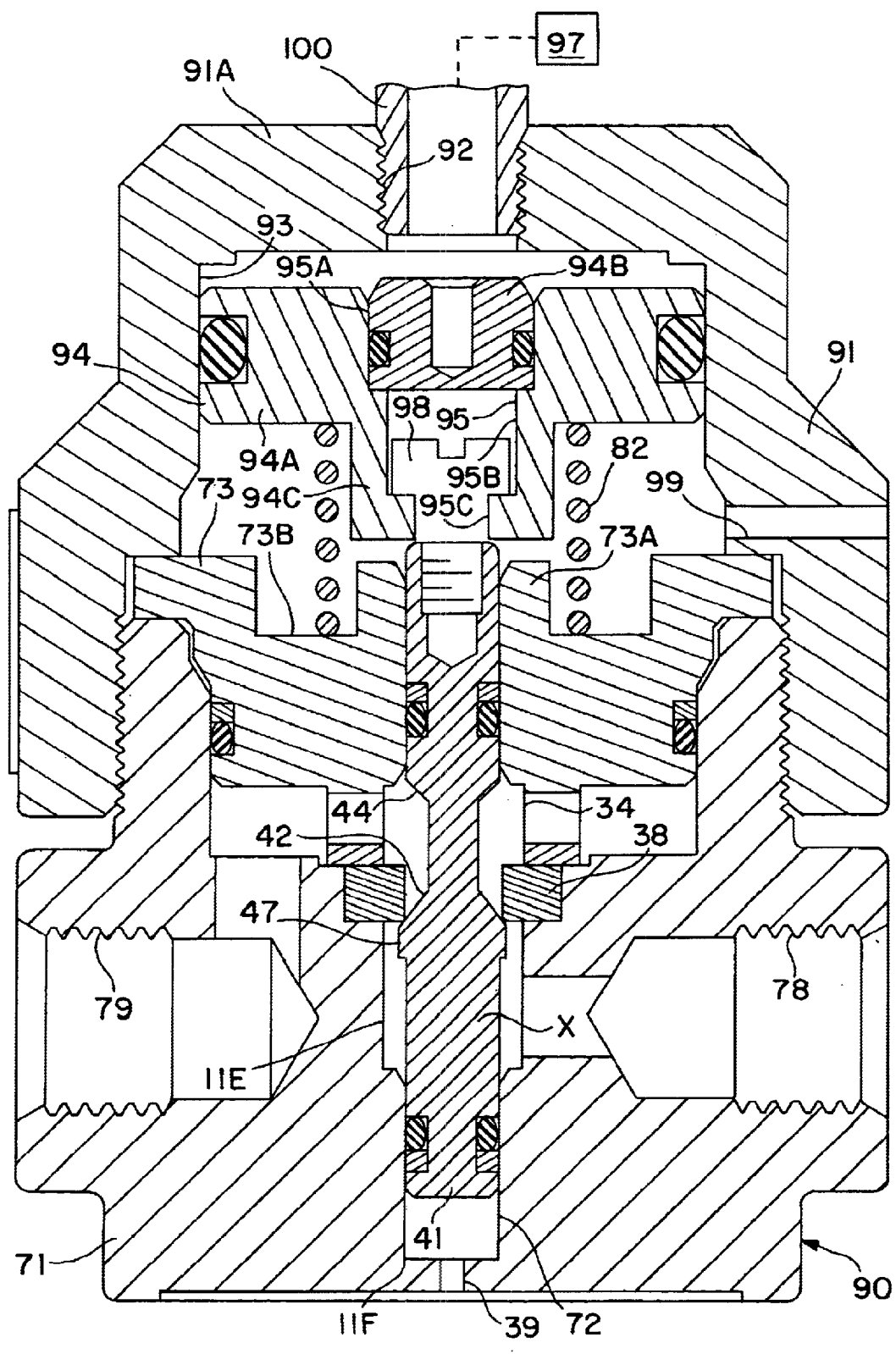
FIG. 4 is a cross sectional view of the third embodiment of the invention.

The third embodiment of the valve device of this invention, generally designated 90, see FIG. 4, includes a valve body 71, a fitting 73, a valve seat 38 and a valve stem X that advantageously are of the same construction as the corresponding members of the second embodiment. The valve device 90 includes a bonnet (cap) 91 threadedly mounted to the valve body and clamps the fitting enlarged diametric portion against the valve body, the bonnet having a downwardly opening chamber into which the fitting and valve body extends that forms part of the bonnet bore that extends axially therethrough. The bonnet top central portion 91A has a control port (a threaded bore portion) 92 with a connector (control device) 100 extending therein through which a valve control pressure is applied to the cap cavity from a suitable control source 97 for applying and discontinuing the application of a control pressure.

The bonnet cavity is in part defined by an axially intermediate bore portion 93 in which a sensor 94 is axially movable. The sensor includes a piston 94A with its enlarged diametric portion having a groove with an O-ring in axially slidable fluid sealing engagement with the wall defining bore portion 93. A coil spring 82 abuts against the piston enlarged diametric flange and the bottom wall 73B that in part defines an annular groove surrounding the boss 73A. The sensor also includes a plug 94B with an O-ring in fluid sealing engagement with the upper enlarged diametric portion 95A of the sensor bore 95 that extends axially therethrough and is limited in axial downward movement by abutting against the shoulder at the intersection of portion 95A with the intermediate diameter bore portion 95B of the sensor bore 95. The upward movement of the plug in the sensor bore is limited by abutting against the bonnet central top portion 91A.

Further, the sensor includes a screw 98 threadedly connected to the upper end of the valve stem and has its head portion abuttable against the shoulder of the piston formed by the intersection of piston bore portion 95B and the reduced diameter bore portion 95C. The reduced diameter bore portion 94C of the piston is abuttable against the valve stem for moving the valve stem to its valve open position and is abuttable against the boss 73A for limiting the movement of the valve stem in a valve opening direction. The coil spring constantly resiliently urges the sensor to move the valve stem to its valve closed position. The space axially between the piston and the fitting is vented to the atmosphere by the vent aperture 99 in the bonnet.

When the control source 97 applies fluid under pressure through the port 92, the sensor is forced to move the valve stem to its open position. Upon the discontinuance of the application of fluid under pressure through port 92 and allowing fluid under pressure to vent from the bonnet chamber which in part is defined by bore portion 93, the coil spring moves the sensor to move the valve stem to its valve closed position. In the valve open position, the valve opening movement is limited by one of the piston 94A and the plug 94B abutting against the top central portion of the bonnet. Upon applying fluid under pressure through connector 100, the piston is forced to have its reduced diameter portion abut against the valve stem and move the valve stem to a valve opened position.

Figure 5:
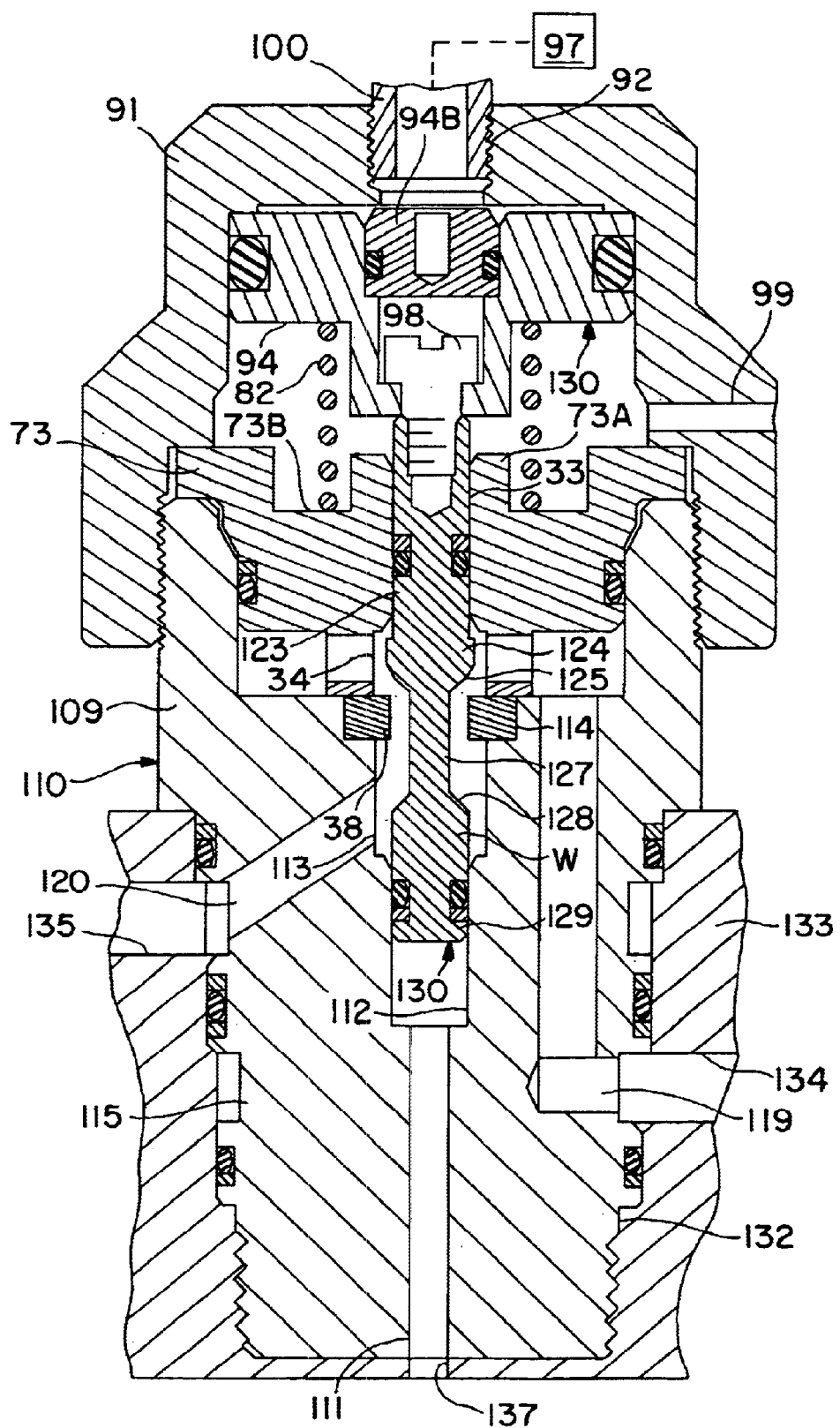
FIG. 5 is a cross sectional view of the fourth embodiment of the invention showing its mounting in a manifold with only a portion of the manifold being shown.

Referring to FIG. 5, the fourth embodiment of the valve device of this invention, generally designated 110, includes an axially elongated valve body 115 with a bore extending axially therethrough. The valve body 109 has a lower threaded end portion 109A for being threaded into a bore 132 of a manifold 133. The manifold has a passage 134 that opens to the valve inlet (passage) 119 and a passage 135 that opens to the valve outlet (passage) 120. Grooves are provided in the valve body for mounting O-rings in fluid sealing engagement with the manifold axially below the passage 134, axially between passages 134, 135 and axially above passage 135. The valve body bore has a reduced diameter bore portion 111 that opens to a manifold vent passage 137 that may open to the ambient atmosphere. The manifold may include additional bores 132 (not shown) with a valve 110 threaded into each manifold bore with pressurized fluid being applied to the inlets and flowing out of each of the valves outlets when the respective valve is open. The opening and closing of each of the valves 110 can be controlled in a manner disclosed herein. Thus, with a valve open, fluid under pressure can fluid flow from the valve outlet and through a manifold passage to the inlet (passage) of a second valve (not shown) 110.

The valve body bore has reduced diameter bore portion 111 opening through the valve body bottom surface and to the axial intermediate diameter bore portion 112 and an enlarged diameter bore portion 113 that extends between bore portion 112 and a further enlarged diameter bore portion 114. Further, the valve device includes sensor 94, a fitting 73 and a bonnet (cap) 91 threadedly mounted to the valve body to clamp the fitting therebetween in a manner such as described with reference to the other embodiments. The fitting has bore portions 33 and 34 with bore portion 34 opening to the body bore portion 114 and being of the same diameter as bore portion 113. The valve body inlet (passage) 119 opens through radial apertures in the reduced diameter portion to the fitting bore portion 34, the fitting clamping the valve seat 38 against the valve body with the valve seat being located in the bore portion 114. The valve body outlet (passage) 120 opens to bore portion 113 on the axial opposite side of the valve seat 38 from the opening of the inlet through the fitting apertures to bore portion 34.

Mounted to extend axially through the valve seat and axially movable within bores 33, 34 and bore portions 112, 113 and 114 is the valve stem W of a valve member, generally designated 130. The lower end portion 129 of the valve stem forms a close sliding fit with the wall defining bore portion 112 and has a groove mounting an O-ring to form an axially sliding fluid seal with the wall of bore portion 112. The diameter of the bore portion 112 is the same as that of bore 33.

The valve stem portion 129 is joined to the major base of the stem frustoconical portion 128. The minor base of the frustoconical portion 128 is joined to the axially elongated, reduced diameter stem portion 127 which is of a diameter substantially smaller than the inner diameter of the valve seat. In both of the valve stem opened and closed positions, the bore portion 113 opens to the reduced diameter stem portion 127 which is of a substantially smaller diameter than the inner diameter of the valve seat. The upper end of the stem portion 127 is joined to the minor base of the stem frustoconical portion 125 while its major base is joined to a slightly larger diameter portion 124 that is of a diameter greater than the inner diameter of the valve seat and of a slightly larger diameter than the axially opposite end portions 129 and 123 of the valve stem. The upper end of the enlarged diametric portion 124 is joined to the axially elongated stem upper portion 123. Portion 123 is of a diameter to form a close axially sliding fit with bore portion 33 and has a groove to mount an O-ring to form an axially slidable fluid seal with the wall defining bore portion 33. Further, stem portion 123 is of the same diameter as stem portion 129.

The sensor 94 is connected by a screw 98 to the upper portion 123 of the valve stem while a coil spring 82 abuts against the sensor to resiliently urge it and through the screw to move the valve stem to its valve open position. A vent aperture 99 places the part of the cap cavity axially between the fitting 73 and the sensor 94 in fluid communication with the ambient atmosphere. When fluid under pressure is applied through port 100, the sensor is forced downwardly to either through screw 98 or abutting against the upper end of the valve stem force the valve stem to move to a valve closed position with frustoconical portion 125 abutting against the valve seat. Upon discontinuance of the application of fluid under pressure and the connection of the port 100 to an exhaust (not shown), the sensor is resiliently moved to move the valve stem to a valve open position.

Even though the manifold is illustrated as having only one manifold bore 132, it is to be understood that usually the manifold would have additional bores. For example, with a bore 132 to the left of that shown, passage 135 would be fluidly connected to the passage 119 of a second valve device (not shown).

Although the fourth embodiment has been described as being actuated by pressurized fluid, it is to be understood that a motor or solenoid actuator such as described with reference to either the first or second embodiment can be used. Further, due to the balanced valve arrangement, any one of the first, second and third embodiments can have fluid under pressure applied to what has been described as the outlet and what has been described as the inlet would be the outlet. In such an event, for example with the first embodiment, when the motor is actuated to move the sensor 22 downwardly, fluid under pressure would flow from the passage 45 to the passage 44. Similarly, with the fourth embodiment, with the inlet and outlet passages 119 and 120 were reversed, in the valve open condition, pressurized fluid would flow from the passage 120 to the passage 119.

With reference to each of the embodiments, the valve body, fitting and bonnet bores are coaxial and extend to open through axially opposite ends of the respective member. Further, for each of the embodiments, the bottom wall that defines part of the annular groove surrounding the boss is more remote from the sensor than the upper annular end of the boss.

With the balanced valve embodiments of this invention, one can use low actuation forces to control high pressure flows through the valve, for example the valve can be used to control the flow of fluid of pressures up to twenty thousand psi with an actuation force of 50 pounds. Further, with the balanced valve of this invention, there is a reduced load on the valve seat, which provides longer valve seat life.

What is claimed is:

1. Valve apparatus comprising a valve body having an axial bore including an enlarged diametric bore portion, a second bore portion of a smaller diameter than the enlarged bore portion to form an annular shoulder and a third bore portion opening to the second bore portion axially opposite of the enlarged diametric portion, a fitting removable extending in the enlarged diametric bore portion and having a radially centered fitting bore extending axially extending therethrough, a bonnet removably mounted to the valve body and having a bore opening to the fitting bore, a valve seat mounted in the valve body and extending within at least one of the fitting bore and the valve body third bore portion, the valve body having a first passage opening to the third bore portion and a second passage opening to at least one of the body third bore portion and to the fitting bore axially opposite the valve seat from the opening of the first passage to the body third bore portion, one of the passages being a pressurized fluid inlet passage and the other an outlet passage, the fitting bore having an axially elongated first bore portion extending axially remote from the valve seat, an axially elongated valve stem extending axially through the valve seat and being axially movable between a valve opening and a valve closed position, the valve stem including a first stem end portion axially movable within the third bore portion in fluid sealing relationship therewith, an axially opposite second end portion axially movable in the fitting first end portion in fluid sealing relationship therewith, an axially elongated intermediate third stem portion extending within the valve seat, a fourth stem portion connecting the first stem portion to the third stem portion and a fifth stem portion connecting the second stem portion to the third stem portion axially opposite the fourth stem portion, the valve stem in its valve closed position having one of the fourth and the fifth stem portions in abutting relationship to the valve seat to block fluid flow from one of the passages to the other passage, the stem first and second portions being of the same diameter and of a larger diameter than the third stem portion, a sensor axially movable in the bonnet bore from a first position to a second position for moving the valve stem from one of its position to its other position, resilient means for constantly urging the sensor to its first position and powered actuator means for forcing the sensor to move from its first position to its second position.

2. The valve apparatus of claim 1 wherein the fitting includes an annular boss having the fitting first bore portion opening therethrough, one of the valve stem and the sensor having a portion abuttable against the boss for limiting the axial movement of the sensor from its first position to its second position.

3. The valve apparatus of claim 2 wherein the actuator means comprises an electric motor having rotary drive shaft mechanism and a control member axially movable without rotary movement relative to the bonnet by the rotation of the drive shaft mechanism, said control member being abuttable against the sensor for moving the sensor to move the valve stem from its first position to its second position as the drive shaft mechanism is rotated in one angular direction.

4. The valve apparatus of claim 2 wherein the actuator means includes a solenoid having an armature operable for moving the sensor to move the valve stem from its first position to its second position.

5. The valve apparatus of claim 2 wherein the sensor includes a piston movable between the sensor positions and the actuator means includes means for applying fluid under pressure to the bonnet for moving the piston toward the sensor second position.

6. The valve apparatus of claim 2 wherein the valve body has a bore portion of a smaller diameter than the third bore portion for fluidly connecting the third bore portion to the ambient atmosphere and the bonnet has one of the actuator means extending in the bonnet bore and a vent for placing the bonnet bore in fluid communication with the ambient atmosphere.

7. The valve apparatus of claim 2 wherein the fitting has a reduced diameter end portion of an outer diameter substantially less than the diameter of the body second bore portion and extending within the body second bore portion for abutting against the valve seat.

8. The valve apparatus of claim 7 wherein the fitting bore has a second bore portion opening to the fitting first bore portion and to the valve seat and the fitting has a reduced diameter portion having the fitting second bore portion and a radial bore that is a part of the second passage and opens to the fitting second bore portion.

9. Balanced valve apparatus comprising a valve device having an axial valve bore that has a first axially elongated bore portion having a first end part and an axially opposite second end part, a second axially elongated bore portion having a first end part and a second end part opening to the first bore portion second end part, the first and second bore portions first parts being of the same diameter, a third bore portion have a first part opening to the first bore portion first end part and an axially opposite second end part and a fourth bore portion that is of a smaller diameter than the second bore portion first end part for fluidly connecting the second bore portion first end part to the ambient atmosphere, a valve seat disposed axially between the first and second bore portions second bore parts, a valve member having an axially elongated valve stem extending through the valve seat and axially movable in the valve bore first and second portions between a valve open position and a closed position abutting against the valve seat and a sensor in the third bore portion and operatively connected to the valve member for moving the valve member between its positions, resilient means acting against the sensor for constantly urging it to move the valve member from one of its positions to the other of its positions and actuator means for selectively forcing the sensor to move the valve member from the position to which it is resiliently urged to the other of its positions, the valve stem having axially opposite first and second end portions in fluid sealing relationship to the first bore portion first part and second bore portion first part respectively, and an axially intermediate portion extending between the stem end portions that has a part for abutting against the valve seat in the valve closed position to block fluid flow through the valve seat and a second part of a smaller diameter than the inner diameter of the valve seat to permit fluid flow through the valve seat when the valve member is in its valve open position, an inlet passage opening to one of the first and second bore portions second parts of the valve bore and an outlet passage opening to the other of the first and second bore portions second end parts axially opposite the valve seat from the opening of the first passage to the valve bore.

10. The balanced valve apparatus of claim 9 wherein the valve device includes a valve body having the second bore portion and a fitting removably mounted to the valve body and having the first bore portion and the valve seat extending between the fitting and valve seat.

11. The balanced valve apparatus of claim 10 wherein the valve device includes a bonnet removably mounted to the valve body and having the third bore portion and the resilient means acts between the sensor and the fitting.

12. The balanced valve apparatus of claim 11 wherein the sensor comprises a piston axially movable in the third bore portion and in fluid sealing relationship with the bonnet and the valve device includes a connector for selectively applying fluid under pressure to the third bore portion to force the piston to move the valve stem from one of its position to its other position.

13. The balanced valve apparatus of claim 11 wherein the actuator means includes a solenoid mounted to the bonnet and having an armature abuttable against the sensor for moving the sensor and thereby the valve stem against the action of the resilient means and energizable means for moving the armature against the action of the resilient means and upon being deenergized, allowing the resilient means to move the sensor.

14. The balanced valve apparatus of claim 13 wherein the solenoid is a linear solenoid and the fitting has an annular groove opening toward the sensor, the resilient means comprises a coil spring extending within the groove and abutting against the sensor and the fitting has an annular boss that is surrounded by the groove, the first bore portion first part at least in part extending through the boss and opening toward the sensor.

15. The balanced valve apparatus of claim 11 wherein the actuator means includes an electric motor mounted to the bonnet, the motor having drive shaft mechanism axially aligned with the valve bore and being rotatably driven and a control member axially movable in one axial direction by the rotation of the shaft mechanism in one angular direction while being retained in a fixed angular position relative to the bonnet between a position moving the sensor against the action of the resilient means to move the valve stem from one of its positions to the other of its positions and rotatable in the opposite angular direction to move control member in the opposite axial direction.

16. The balanced valve apparatus of claim 15 wherein the bonnet has an axially elongated slot, the drive shaft mechanism includes a motor shaft and an attachment keyed to the motor shaft to rotate therewith and having a threaded part and the control member has a control element having a threaded part to form a mating fit with the attachment threaded part and key means mounted to the control member threaded part and extended into said slot to block rotation of the control element as the motor shaft rotates.

17. Balanced valve apparatus comprising a valve body having axially opposite first and second ends and an axial bore extending therethrough, the body bore having an enlarged diametric bore portion opening through the body first end and a second bore portion of a smaller diameter than the body enlarged diameter bore portion and opening to the last mentioned bore portion, a bonnet mounted to the valve body and having axially opposite first and second ends and an axial bore extending therethrough coaxially with the body bore, the bonnet bore having an enlarged diametric end portion opening through the body first end and to the body enlarged diametric bore portion, a fitting extending within the bonnet and the valve body enlarged diametric bore portions and removably clamped between the bonnet and the valve body, the fitting having a bore extending axially therethrough, opening to each of the bonnet and body bores and being coaxial with the body and bonnet bores, a valve seat disposed between the body second bore portion and the fitting bore portion, a valve member extending within the said bores and axially movable between valve opened and closed positions, spring means acting against the valve member for resiliently urging the valve member to its closed position, said valve member including an axially elongated valve stem extending within the body and fitting bores and through the valve seat and being axially movable between a valve closed position abutting against the valve seat and a valve open position permitting fluid flow therethrough from the body bore to the fitting bore portion and a sensor extending within the bonnet bore and connected to the valve stem for moving the valve stem from its open position to its closed position, and actuator means mounted to the bonnet and extending within the bonnet bore for selectively acting against the sensor for moving the sensor to move the valve stem to its valve open position, the valve body having a fluid outlet passage opening to the fitting bore and a pressurized fluid inlet passage opening to the body bore axially opposite the valve seat from the opening of the outlet passage to the fitting bore.

18. The balanced valve device of claim 17 wherein the fitting has an annular groove radially spaced from the fitting bore and opening axially toward the sensor to provide a boss having the fitting bore extending therethrough, the sensor being abuttable against the boss to limit the axial movement of the sensor in an axial direction to move the valve stem to its valve open position.

19. The balanced valve device of claim 17 wherein the actuator means includes an electric motor having a motor shaft that is rotatable in selected opposite angular directions while remaining in a fixed axial position relative to the bonnet, a control member mounted in the bonnet bore for axial movement for forcing the sensor to move the valve stem to its valve open position while being retained in a fixed angular position relative to the bonnet and attachment means keyed to the motor shaft to rotate therewith and cooperate with the control member to move the control member axially as the shaft rotates.

20. The balanced valve device of claim 17 wherein the actuator means includes a linear solenoid mounted to the bonnet and having an armature extending within the bonnet bore and upon being energized, moving the armature to move the sensor and thereby the valve stem to its valve open position.

* * * * *